United States Patent [19]
Shiga et al.

[11] Patent Number: 5,642,510
[45] Date of Patent: Jun. 24, 1997

[54] CATALOG MANAGEMENT SYSTEM USING A CATALOG POOL, POOL MANAGEMENT TABLE AND POOL NUMBER DATA TABLE

[75] Inventors: Shoji Shiga, Tokyo; Hiroshi Sakamoto, Hyogo, both of Japan

[73] Assignee: NEC Corporation, Tokyo, Japan

[21] Appl. No.: 68,191

[22] Filed: May 28, 1993

[30] Foreign Application Priority Data

May 28, 1992 [JP] Japan ..................... 4-160103

[51] Int. Cl.$^6$ .............................. G06F 9/40; G06F 12/00
[52] U.S. Cl. .................... 395/701; 395/612; 395/474; 364/DIG. 1
[58] Field of Search .................... 395/700, 600, 395/375, 701

[56] References Cited

U.S. PATENT DOCUMENTS

| | | | |
|---|---|---|---|
| 5,175,828 | 12/1992 | Hall et al. | 395/375 |
| 5,247,681 | 9/1993 | Janis et al. | 395/700 |
| 5,291,601 | 3/1994 | Sands | 395/700 |
| 5,375,241 | 12/1994 | Walsh | 395/700 |
| 5,381,547 | 1/1995 | Flug et al. | 395/700 |

OTHER PUBLICATIONS

"Planning and Writing a Multi-threaded OS-2 Program with Microsoft C", by Richard Hale Shaw, Mocrosoft Systems Journal, v4, n2, p.63(18) Mar. 1989.

"The Windows File-Oriented Common Dialog Functions" by Duncan Ray, PC Magazine, v11, n10, p.379(8) May 1992.

Primary Examiner—Thomas G. Black
Assistant Examiner—Hosain T. Alam
Attorney, Agent, or Firm—Foley & Lardner

[57] ABSTRACT

A catalog control portion invokes a catalog input/output portion, and develops data of a catalog data file to a catalog data area via a catalog data management portion, wherein the catalog data area comprises a catalog pool for storing each pool data and a pool management table for managing each catalog pool by its pool number. Also included is a data table which stores the pool number and the pool data of the catalog to be currently executed. During execution, the catalog control portion sets the pool number, pool data and the like to reference to the pool number of the data table prior to access to the catalog data to determine a catalog pool which is the current target from the pool management. Therefore, when in the interactive processing, nesting of the catalog is controlled, and it is possible to achieve control of a general-purpose catalog by a simple program structure to improve catalog storage or maintenance efficiency and memory utilization efficiency.

4 Claims, 11 Drawing Sheets

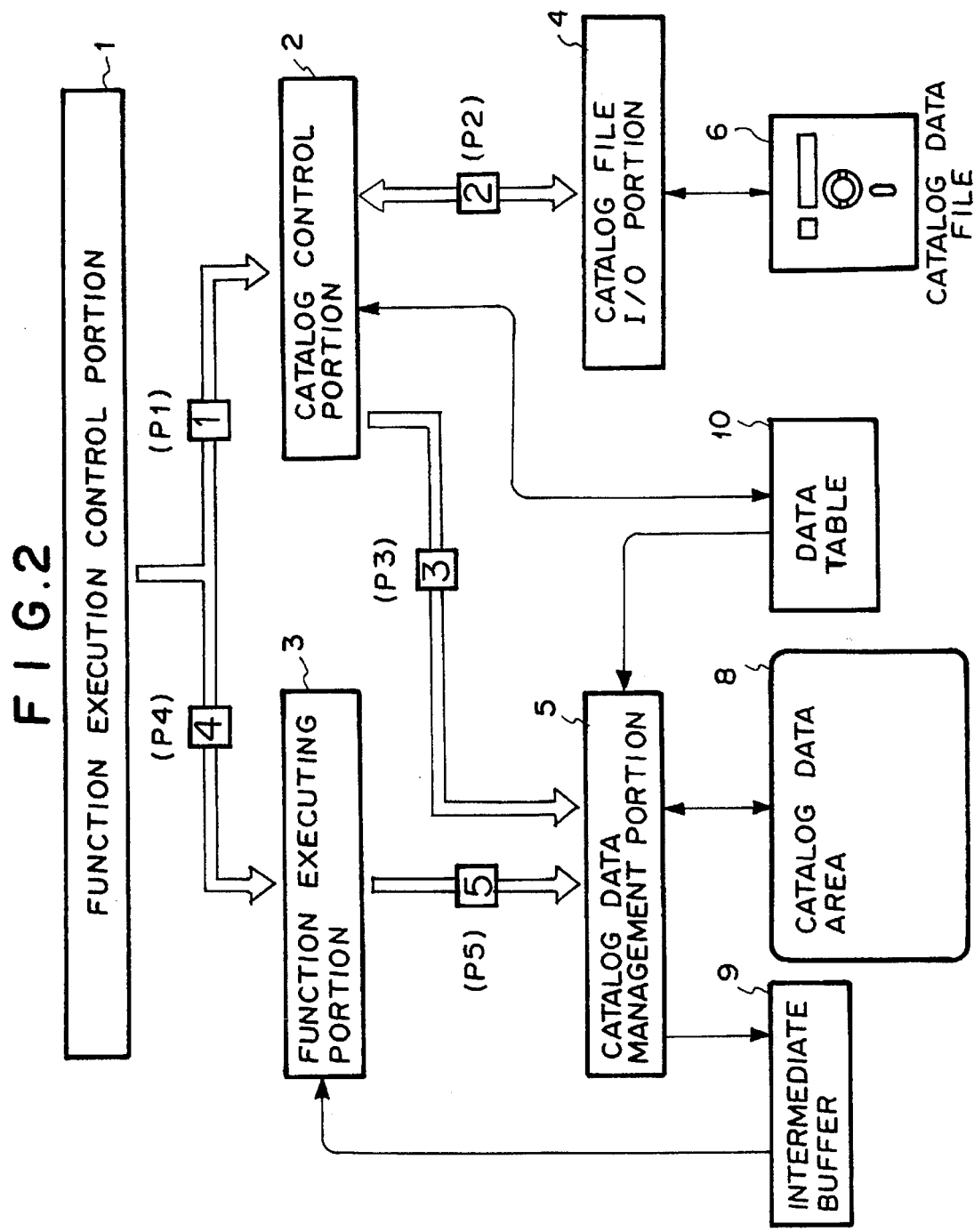

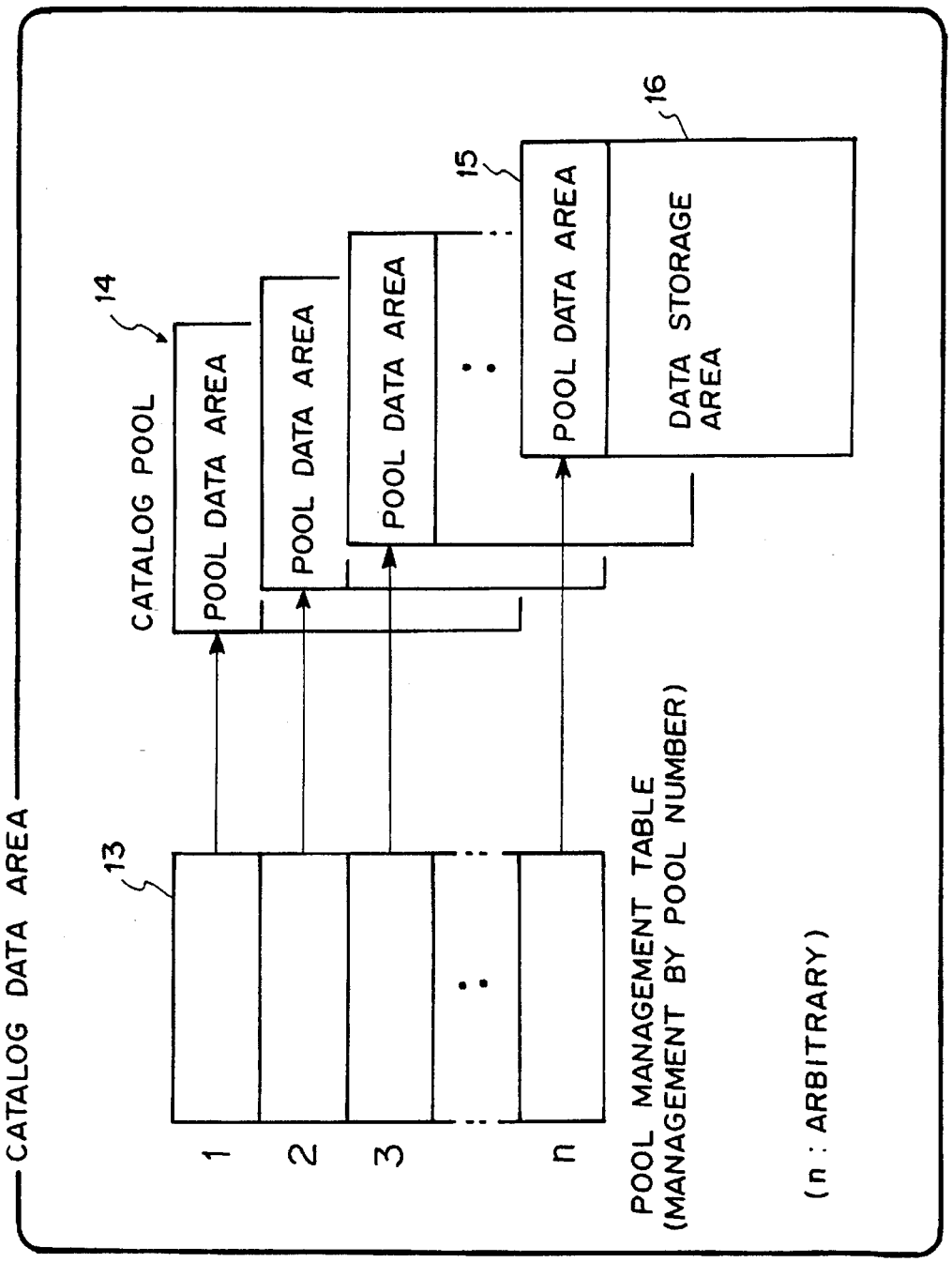

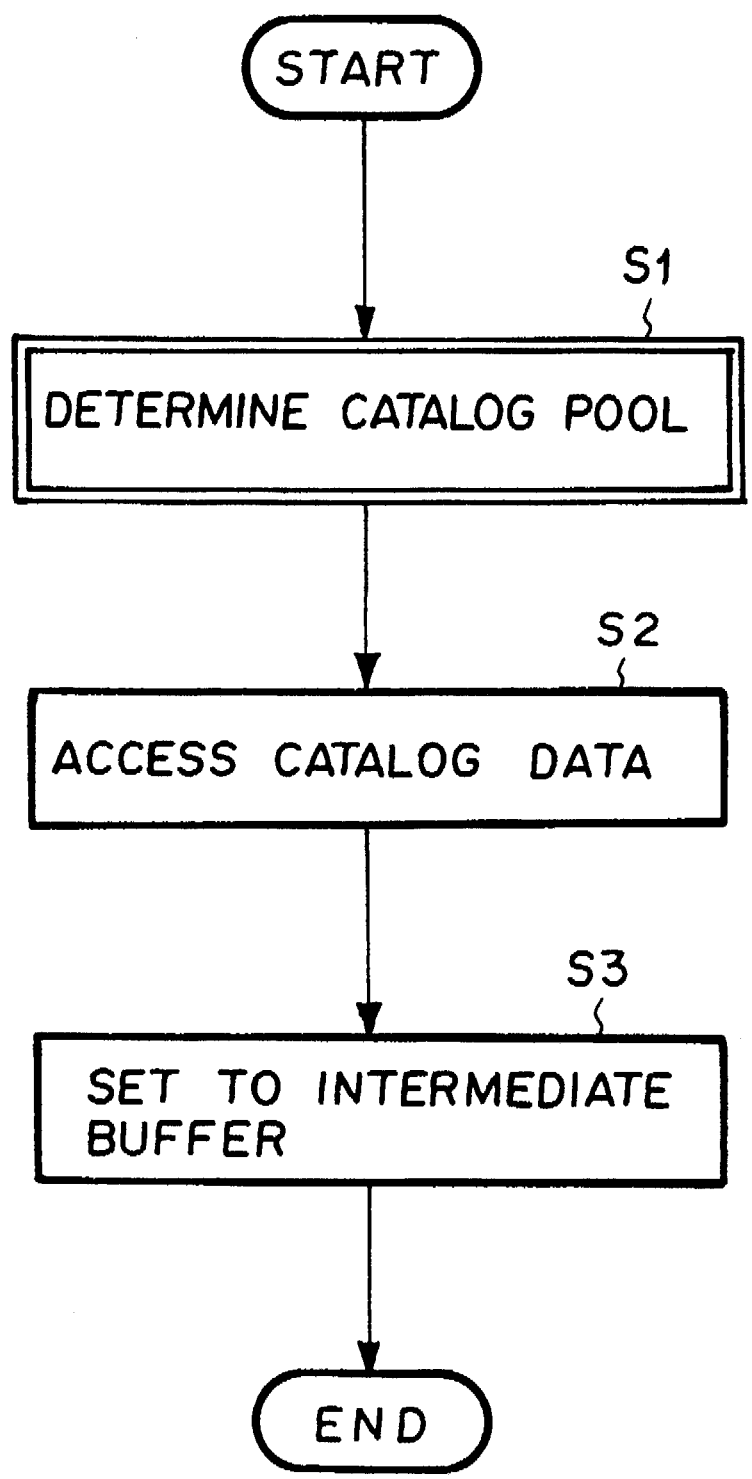

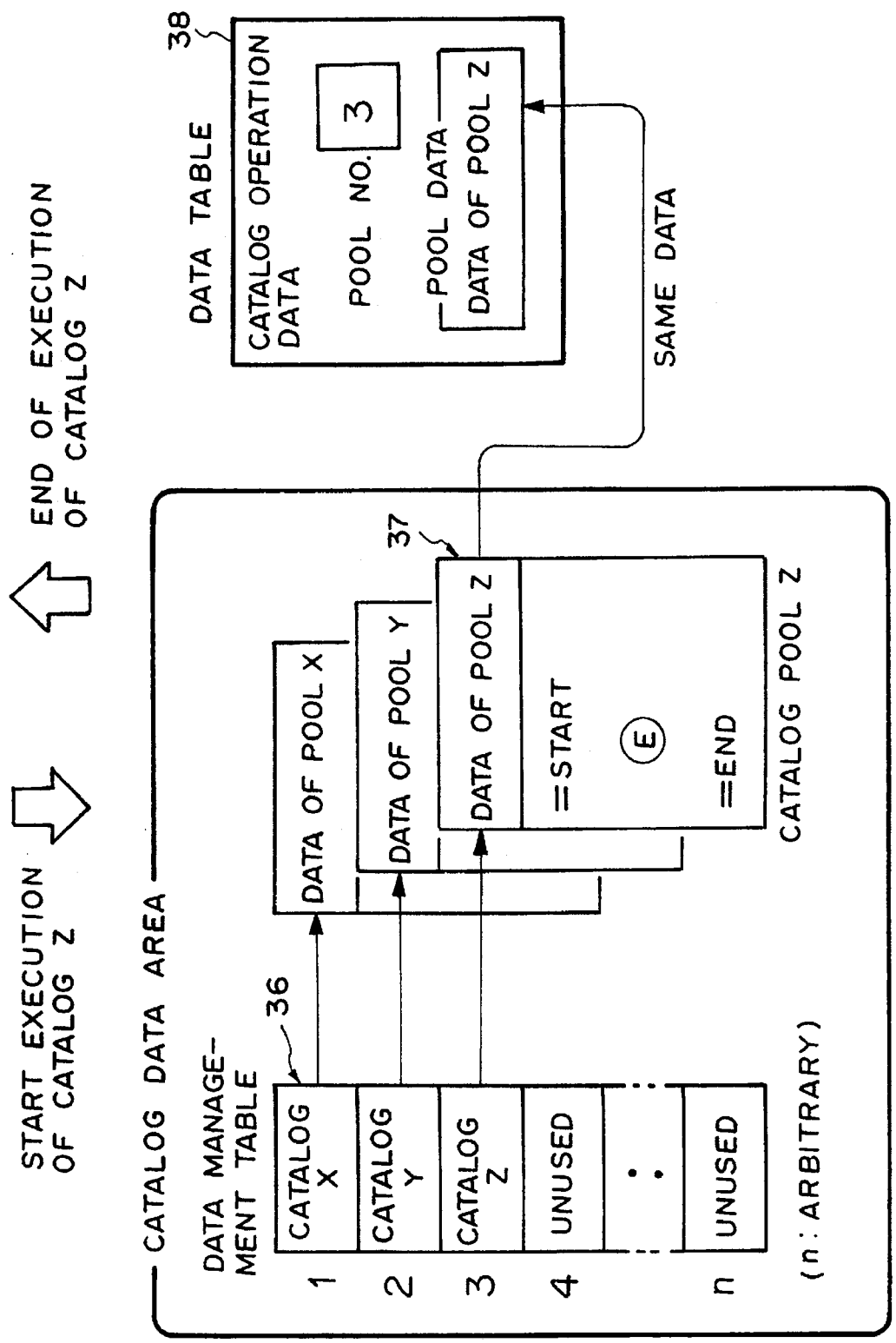

CATALOG MANAGEMENT SYSTEM USING A CATALOG POOL, POOL MANAGEMENT TABLE AND POOL NUMBER DATA TABLE

BACKGROUND OF THE INVENTION

The present invention relates to a catalog management system having a function to register routine operations for repeated execution.

In an interactive processing system, a catalog function is intended to register routine operations which are repeatedly executed. The catalog shows an operational history and is created in accordance with operator actions in an interactive processing system. The catalog data is stored as a file in a memory.

Therefore, a desired operation can be executed by using a single catalog, and it is not necessary that any arbitrary catalog invoke another catalog or catalogs. However, in a certain operation, several catalogs are prepared and, when part of each prepared catalog is analyzed, it is often found that each catalog consists of operational procedures which are substantially similar to another catalog.

However, if, as described above, the overlapping portions are present, then catalog size is greater than necessary, and catalog storage efficiency is reduced. Further, when a change is made from one catalog to another, the maintenance efficiency can also be reduced.

In order to solve these problems, it is conceived to form operational procedures inherent to each catalog into a specific catalog, from which another catalog which constitutes the common operational procedures is invoked.

As a result, when catalog data for a certain catalog is developed to a memory, by expanding the catalog data and storing it in the memory other catalog data invoked from this catalog may be inserted and developed into part of the foregoing catalog data developed to the memory to be executed as if it were part of the certain catalog. This kind of system is hereinafter referred to as an "in-line developing system".

Such an in-line developing system is effective to increase the catalog storage efficiency and maintenance efficiency.

However, since, in this system the memory corresponding to the size of the invoked catalog is used, the utilizing efficiency of the memory can often be reduced. For example, if, as shown in FIG. 1(a), the catalog of the same procedure is invoked from a certain catalog more than once, then, as shown in FIG. 1(b), a catalog Y of the same content is developed to the memory more than once, which results in a waste of resources because the area where the catalog is developed thereafter is the same in content as the area for the first time invocation.

Further, since the in-line developing system necessitates the insertion/developing process as the catalog is developed, the program structure becomes complicated.

Further, although the catalog concept allows a more flexible function to be presented to the user, it becomes difficult to follow the effective range of any arbitrary variable or resource, which makes the catalog data structure and the variable management structure complicated.

In view of the foregoing, the present invention was made, and its object is to provide, in the interactive processing system, a catalog management system whose program structure is simple and which allows the catalog storage efficiency, maintenance efficiency and utilizing efficiency to be improved.

SUMMARY OF THE INVENTION

In the present invention, a catalog function system comprises a function execution control portion for, when the execution of the catalog is requested by the user, issuing a catalog start request to a catalog control portion and, for, when a catalog executing environment is generated by the catalog control portion, sequentially repeating invocation of a function executing portion according to catalog data; a catalog control portion for invoking a catalog file input/output portion by the catalog start request to develop the catalog data to a catalog data area; and a function executing portion for executing a function specified to a value set by an intermediate buffer by the catalog data management portion's referencing to a data file so that routine operations of the interactive processing system are registered for repeated execution, comprising:

a pool management table for uniquely determining the catalog pools generated by the number of the catalogs to be nested, as necessary, for storage of each pool data, by the pool number for executing the catalog pool;

a data table having a pool data copied from the catalog pool and pool numbers for allowing nesting;

a catalog control means for setting the pool number within the data table as the execution is started and decrementing upon completion of the execution, adding an entry to the pool management table when the execution is initiated, deleting it when the execution is completed and setting an initial value to the pool data within the catalog pool when the execution is started to copy the newest pool data to the data table to realize nesting; and a catalog data management means for referencing to the pool number within the data table prior to accessing the catalog data in order to achieve the nesting by the control of the catalog control portion to determine a current catalog pool from the pool management table.

According to the system of the present invention, the catalog data area is generated by the number of the nested catalogs. The catalog data areas each have a catalog management table for uniquely determining the catalog table storing the pool data within the pool data area by the pool number for executing this catalog pool, and the data table stores the pool data and the pool number copied from the catalog pool.

When the catalog control means starts to execute, the pool number of the data table is incremented, and, when the execution is completed, it is decremented. The catalog pool is also switched, and the entry is added to or deleted from the pool management table. When the execution is started, the initial value is set to the pool data to copy the newest pool data to the data table. In order to achieve nesting, the catalog data management means references to the pool number of the data table prior to accessing the catalog data to determine the current catalog pool from the pool management table. As a result, the catalog pool can be generated or discarded independently in unit of catalog, and the nesting management becomes possible with a simple program structure.

The present invention will be more clearly understood from the following detailed description with reference to the accompanying drawings.

BRIEF DESCRIPTION OF THE DRAWINGS

FIG. 2 illustrates an arrangement of a catalog management system embodying the present invention;

FIG. 4 shows a structure of the catalog data management portion of FIG. 2;

FIG. 5 is a flowchart of the processing in the catalog data management portion of FIG. 2;

FIG. 11 shows a state diagram when the catalog of FIG. 7 invoked the catalog Z.

DETAILED DESCRIPTION OF THE PREFERRED EMBODIMENTS

Figure 1A:
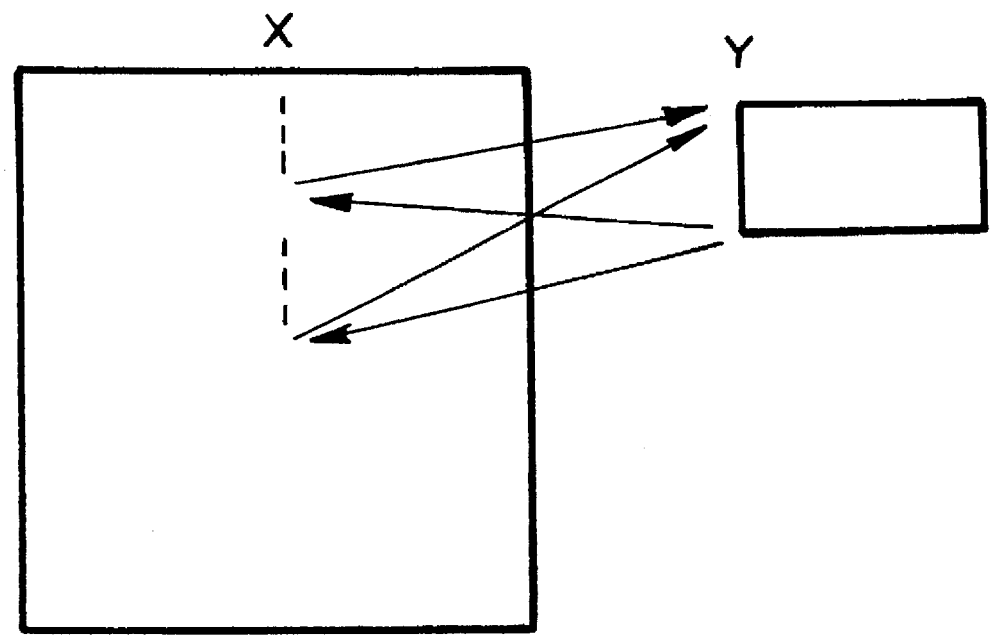
FIGS. 1(a) and 1(b) show states of a catalog developed to a memory according to a conventional in-line developing system, respectively.
Figure 1B:
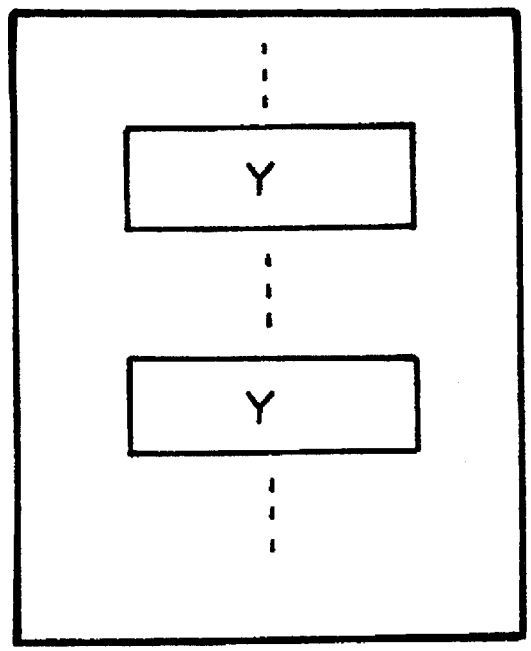

Referring first to FIG. 2, this catalog management system comprises a function execution control portion 1, a catalog control portion 2, a function executing portion 3, a catalog file input/output portion 4, a catalog data management portion 5, a catalog data file 6, a data table 10, a catalog data area 8 and an intermediate buffer 9.

Figure 3:
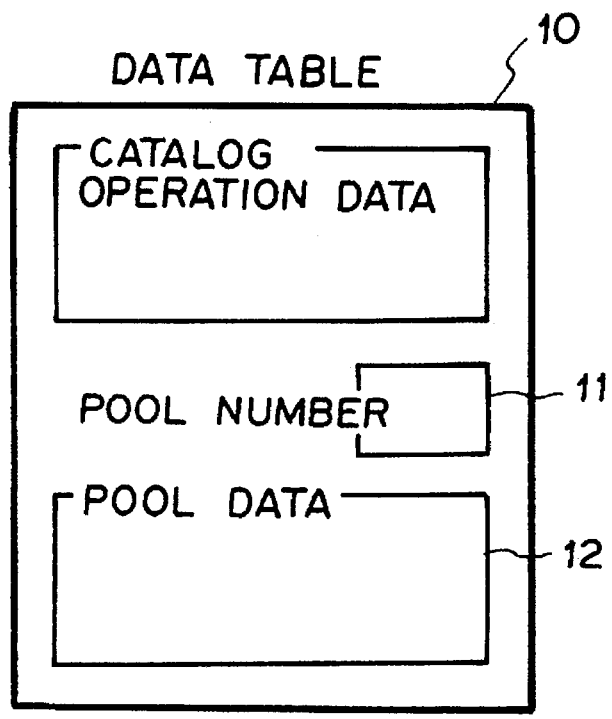
FIG. 3 shows a structure of a data table of the system shown in FIG. 2.

Here, the function execution control portion 1 controls the execution of the overall catalog function. Further, the catalog file I/O portion 4 inputs and outputs the catalog data to the catalog data file 6. Further, the data table 10 and the catalog data area 8 serve as the data structure for achieving nesting according to the present invention. The data table 10 takes a form as illustrated in FIG. 3. Within this data table 10, information regarding the catalog data being currently executed, that is, the information about how the catalog is operated, such as the line number, size, state and the like of the catalog data, is stored.

That is, within this data table 10, the line number, size, state and the like being executed by the catalog, other than the nesting, are stored as the pool data 12. Further, in order to allow the nesting, an area called the pool number 11 is available. Incidentally, the pool number 11 indicates the number of the catalog being currently executed, which means the number of the catalog pool, which will be described later.

Further, the catalog data area 8, which is the memory area where the catalog data is developed, is structured as shown in FIG. 4. That is, the catalog data area 8 comprises more than one catalog pool 14 and the pool management table 13 for managing the same in order to achieve the nesting, and each catalog pool 14 comprises a data storage area 16 in which the catalog data is stored, and a pool data area 15 in which the line number, size, state and the like of the catalog data being executed are stored. The foregoing pool data of the data table 10 can be regarded as being achieved by copying the values from pool data area 15.

Each catalog pool 14 is generated by the number of the nested catalogs, as necessary, and each catalog pool 14 is managed according to the pool number 11 by the pool management table 13. Therefore, since each catalog pool 14 can be uniquely determined by knowing the corresponding pool number 11, even if a plurality of catalog pools 14 exist due to the nesting, it is easy to take out the catalog data of the catalog to be executed.

Further, the catalog control portion 2, when the catalog start request is issued from the function execution control portion 1, invokes the catalog file I/O portion 4, and develops the catalog data of the catalog data file 6 to the catalog data data 8 via the catalog area management portion 5 to generate the catalog executing environment. Incidentally, the catalog control portion 2 can always know the catalog state from the information on how the data table 10 is stored.

Further, the catalog data management portion 5 manages the catalog data area 8 with reference to the data table 10 to set a predetermined parameter to the intermediate buffer 9. Incidentally, the catalog data management portion 5 can always know the state of the catalog based on the information stored within the data file 10. Further, when invoked from the function execution control portion, the function execution portion 3 executes the function specified by the value set by the intermediate buffer 9.

Next, the operation of the catalog management system having such an arrangement is described.

Incidentally, when the catalog is registered and executed, a need to reference to the catalog data necessarily occurs. In the following, in order to simply describe the nesting management system, the catalog executing operation is explained by way of example.

First, when execution of the catalog is requested from the user, the function execution control portion 1 issues a catalog start request to the catalog control portion 2 (P1) to generate a catalog executing environment. At this time, the catalog control portion 2 invokes the catalog file input/output portion 4 (P2) to develop the catalog data of the catalog data file 6 to the catalog data area 8 via the catalog data management portion 5 (P3).

Next, when the catalog executing environment is generated, the function execution control portion 1 sequentially repeatedly invokes a corresponding function executing portion 3 according to the catalog data (P4). At this time, the invoked function executing portion 3 executes a function specified by the value set to the intermediate buffer 9. Setting of the parameters to the intermediate buffer 9 is achieved by invoking of the catalog data management portion 5 by the function executing portion 3 (P5). Incidentally, the data table 10 referenced to by the catalog data management portion 5 is the area, as described above, where the line number, size, state and the like of the catalog data being currently executed are stored.

By the foregoing process, the catalog is sequentially executed and, when all the catalog data are executed, the function execution control portion 1 issues a catalog end request to the catalog control portion 2 (P1) to discard a finally generated catalog executing environment.

Next, a process for utilizing the data structures of FIGS. 2, 3 to achieve nesting is described with reference to FIGS. 4 and 5. Incidentally, in FIGS. 4 and 5, step S1, S12, S13, S15, S16, S22, S23, S24 each illustrate a process necessary to achieve nesting.

The process for achieving the nesting is necessary for the catalog control portion 2 and the catalog data management portion 5.

Data accesses to the catalog data area 8 are all carried out via the catalog data management portion 5. Therefore, the portions other than the catalog control portion 2 and the catalog data management portion 5 need not be conscious of the structure of the catalog data area 8.

In order to achieve nesting, the catalog data management portion 5, as shown in FIG. 5, references to the pool number 11 within the data table 10 prior to access to the catalog data, and determines the catalog pool 14, which constitutes the current target, from the pool management table 13 (step S1). This is necessary for achieving nesting, and the following data accesses within the catalog pool 14 may be the same as in the conventional system.

Next, the start and end of the execution of the catalog control portion will be described below with reference to FIGS. 6(a) and 6(b).

Figure 6A:
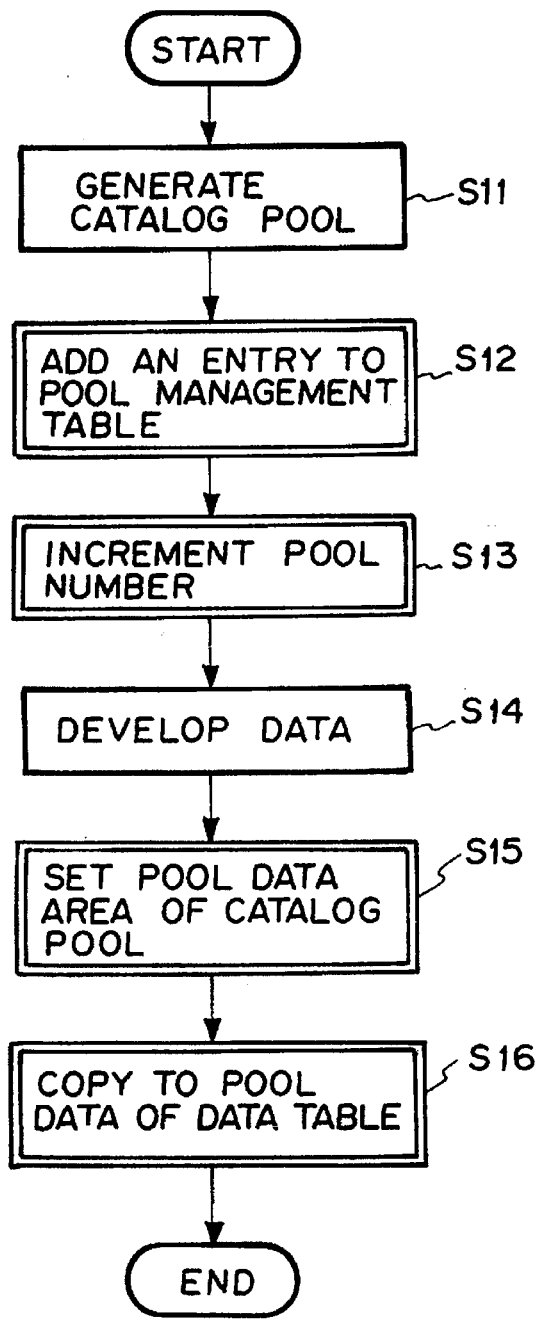
FIGS. 6(a) and 6(b) are flowcharts of the processing in the catalog control portion of FIG. 2.

In the execution start process as shown in FIG. 6(a), first, a catalog table is generated at step S11. That is, an entry is added to the pool management table 13 (see FIG. 4) at step S12 to increment the pool number (step S13). Subsequently, data is developed to the data storage area 16 (step S14) to prepare a pool data area 15 of the catalog pool (step S15). Thereafter, the data of this pool data area 15 is copied to the data table 10 (step S16).

Figure 6B:
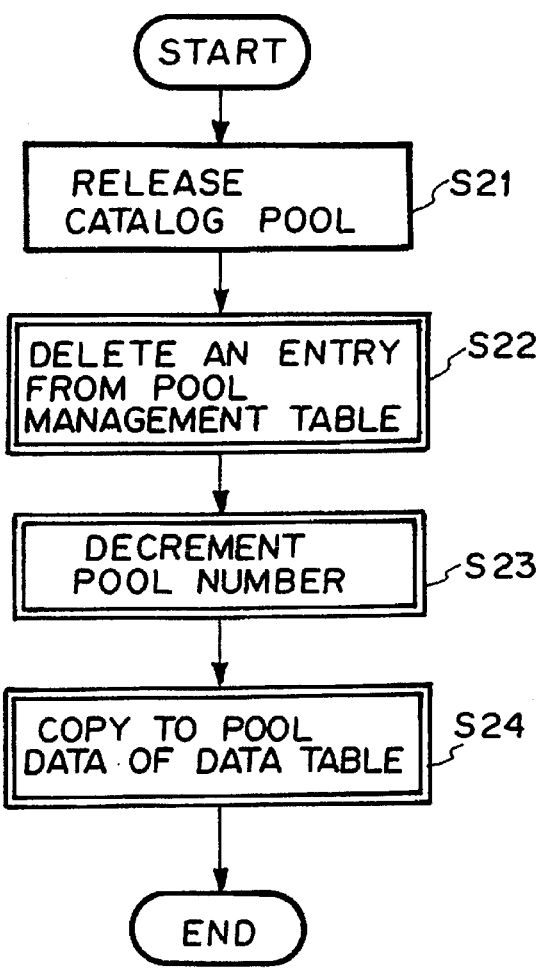

Further, in the execution end process shown in FIG. 6(b), the catalog pool is released (step S21). That is, an entry of the pool management table is deleted (step S22) to decrement the pool number (step S23). Thereafter, data of this pool data area 15 is copied to the data table 10 (step S24). In the foregoing execution start and end processes, their basic processes follow the conventional system but, in order to achieve nesting, three processes are provided for the added areas of the data structure.

That is, in order to achieve nesting, it is necessary to set the pool number 11 within the data table 10, and this process simply increments the pool number at the time of the start of execution in step S13, and decrements at the end of execution in step S23. In the processes of steps S13 and S23, the catalog pool 14 which is the target of the catalog data management portion 5 is switched.

Further, in order to achieve nesting, it is necessary to add and delete the entry to and from the pool management table 13. This is necessary for the catalog data management portion 5 to retrieve by the pool number 11, and is achieved by the adding process at the time of the start of execution in step S12 and by the deleting process at the end of execution in step S22.

In order to achieve nesting, it is further necessary to set the pool data. Each catalog data has the newest pool data for it in the pool data area 15. In step S15 of the execution start process, an initial value is set to this area. Further, the pool area 12 within the data table 10 is obtained by copying the pool data of the catalog being currently executed. This is achieved by copying, in steps S16 S24, the newest value from the pool data area 15 of the catalog pool 14 identified by the pool number 11. By this process, during the execution, the catalog data management portion 5 can readily access the data by referencing to the data table 10.

Heretofore, processes necessary for achieving nesting were described. However, those are all directed to the current catalog, and are not conscious of whether the nesting is under way at any arbitrary point of time at all. This means that it can readily be achieved from the point of programming structure.

Finally, taking a case in which nesting is actually carried out for example, the change of the catalog data area 8 and the data table 10 is described.

Figure 7:
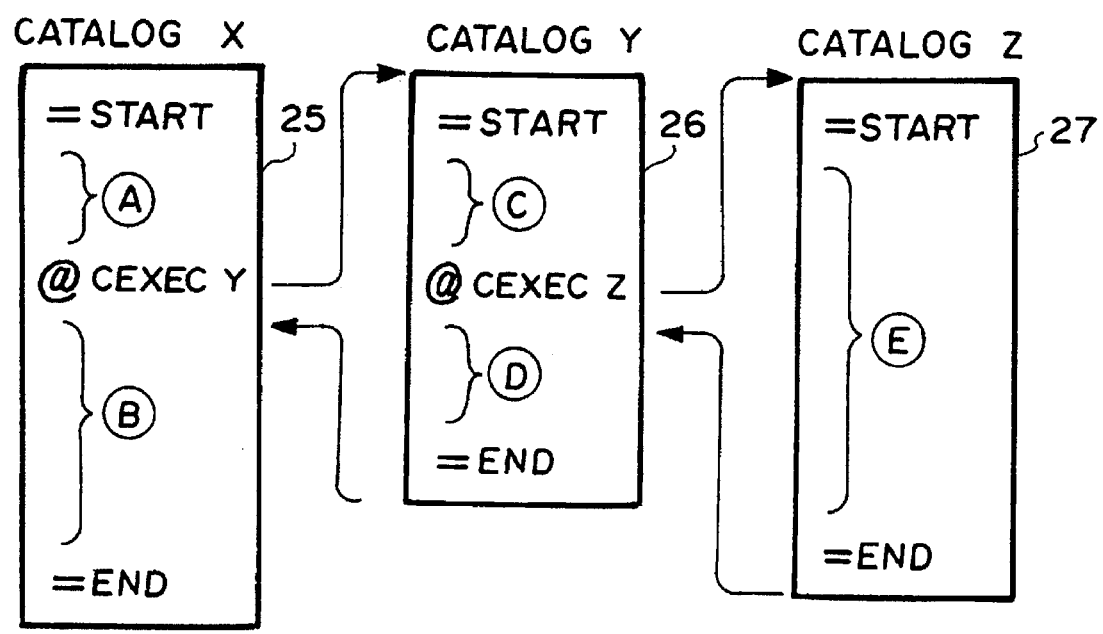
FIG. 7 shows an example of the order in which the catalog is executed in the nesting of the embodiment of FIG. 2.

By way of example, let us assume that there are three catalogs X(25), Y(26) and Z(27) as shown in FIG. 7, in which [=START] means start of the cataloging, [=END] end of the cataloging and [@CEXEC n] is catalog description code for invoking the catalog n. For example, the catalog X of FIG. 7, after the catalog depicted by an "A" portion is executed, invokes the catalog Y and, after the catalog Y is terminated, executes the catalog described at the "B" portion before ending. Therefore, to execute the catalog X means to execute the catalog described in the order of A-C-E-D-B.

The change of the catalog data area and the data table at this time will be described with reference to FIGS. 7 through 10.

Figure 8:
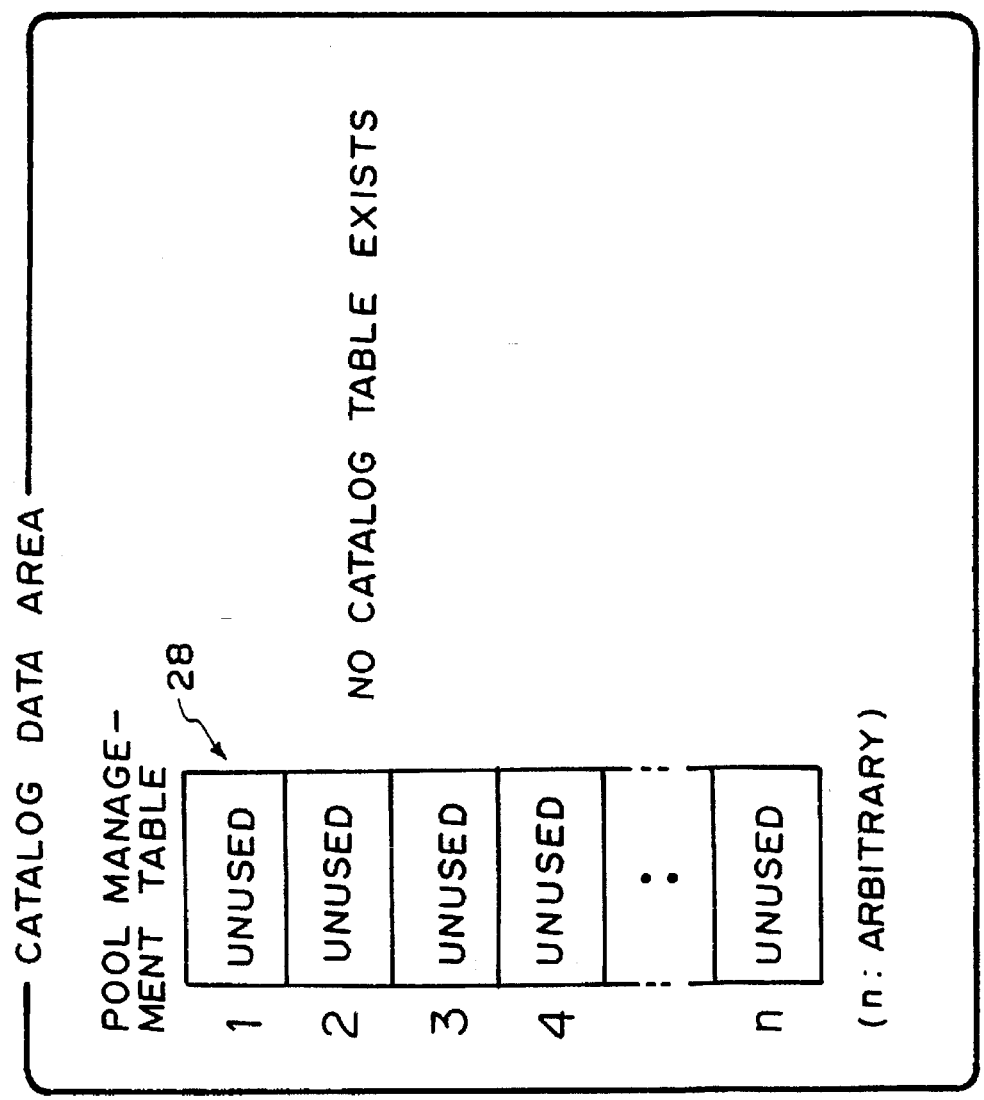
FIG. 8 shows a catalog data area prior to execution of the catalog in nesting and the data table of FIG. 7.

First, the state prior to execution of the catalog is illustrated in FIG. 8. There is no catalog pool, and the pool number of the data table 29 is 0.

Figure 9:
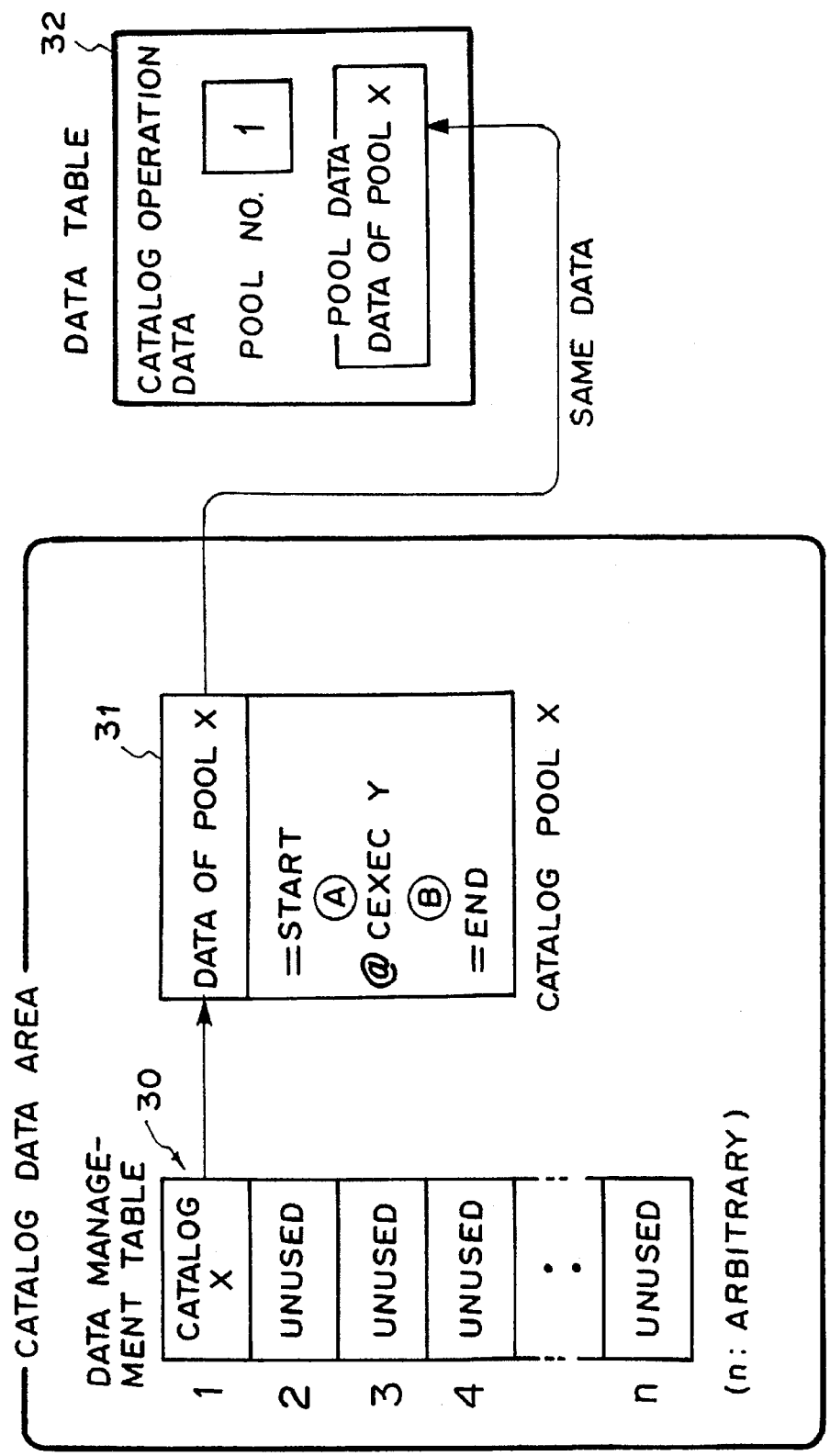
FIG. 9 shows a state diagram of the catalog X of FIG. 7 immediately after it is started to execute.

The catalog pool 14 is generated as necessary. FIG. 9 illustrates a state immediately after the catalog X is started to execute (while the processing shown in FIG. 7 is being executed). The catalog pool X 31 is generated, and the pool number of the data table 32 is 1 and, within the pool data, the data of the pool X is copied.

Figure 10:
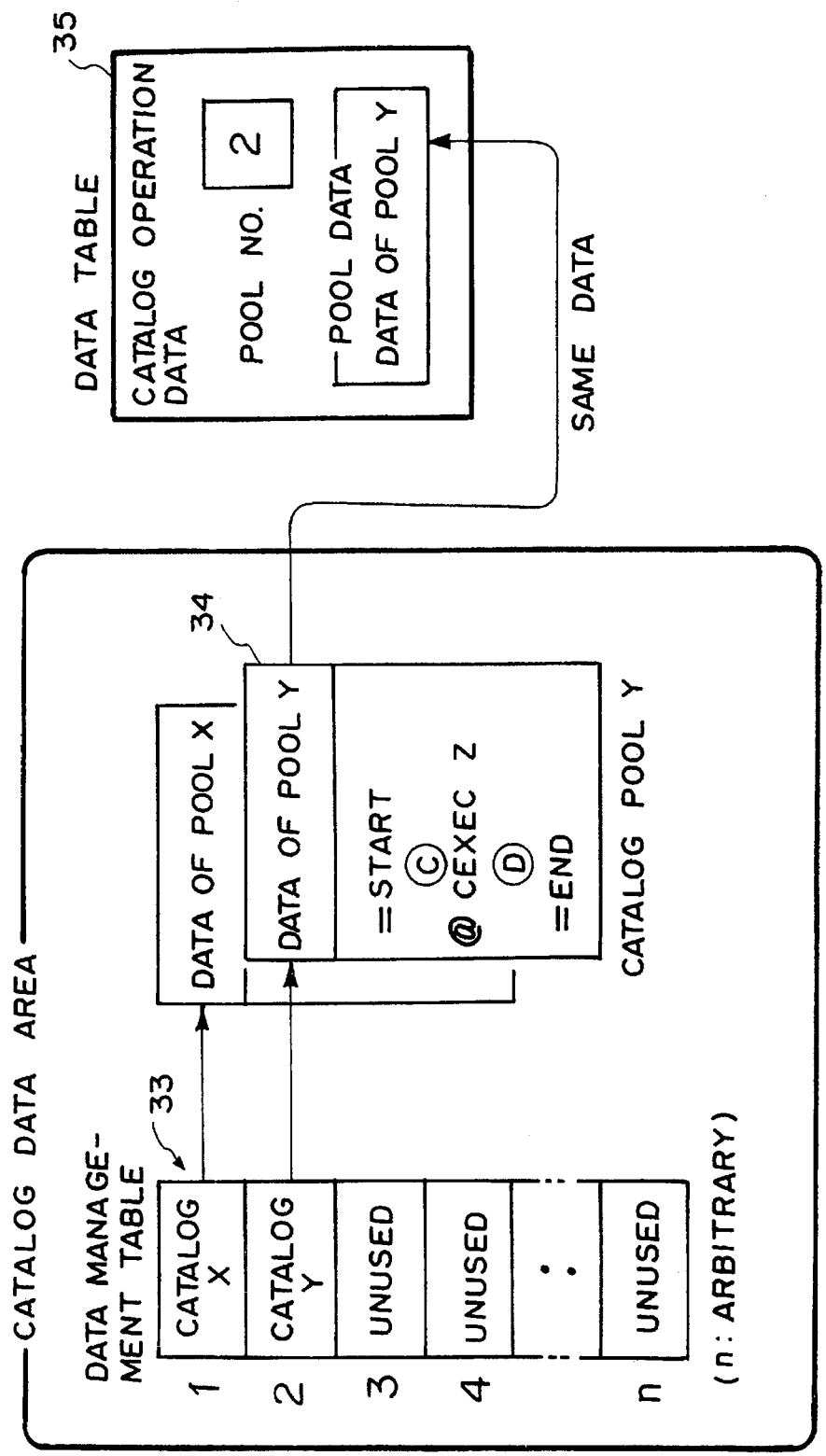
FIG. 10 shows a state diagram of the catalog Y of FIG. 7 immediately after it is started to execute.

At [@CEXEC Y] of the catalog X, the catalog pool Y 34 of the catalog Y is generated. FIG. 10 illustrates a state immediately after the catalog Y is started to execute (while "C" in FIG. 7 is being executed). As shown in the figure, the newly generated catalog pool Y 34 is completely independent of the pool of the invoked catalog X. Further, the pool number of the data table 35 is incremented to become 2 and, within the pool data, the data of the pool Y, which is the pool data indicated by the pool number, is copied. Thus, while the catalog pool Y is being executed, data can be accessed without being conscious that the catalog Y was "invoked from the catalog X".

Similarly, FIG. 11 illustrates a state in which the catalog Y invoked the catalog Z.

Next, it will be described how the execution of the catalog is terminated.

With the catalog Y invoked from the catalog X of FIG. 11 and, further, with the catalog Z invoked from the catalog Y, the catalog Z completes the execution at [=END].

First, the catalog pool Z 37 is released, and a third entry of the pool management table 36 which represented it becomes unused. Next, the pool number of the data table 38 is decremented from 3 to 2. Finally, the pool data being currently executed is copied to the pool data area of the data table 38. At this time, since the pool number is already changed into 2, the newest data on the pool Y can be set by simply "copying the pool data of the pool number".

Next, FIG. 10 also illustrates a state in which the execution of the catalog Z is terminated and returned to the catalog Y. The catalog pool Z of the catalog Z which has been executed is deleted from the memory.

When the execution of the catalog Z is terminated, the catalogs following [@CEXEC Z] of the catalog Y is executed.

Similarly, if the execution of the catalog Y is terminated, then the procedure is returned to the state of FIG. 9 and, if the execution of the catalog X is terminated, then all the catalog pools are released to turn into a state of FIG. 8.

Figure 12:
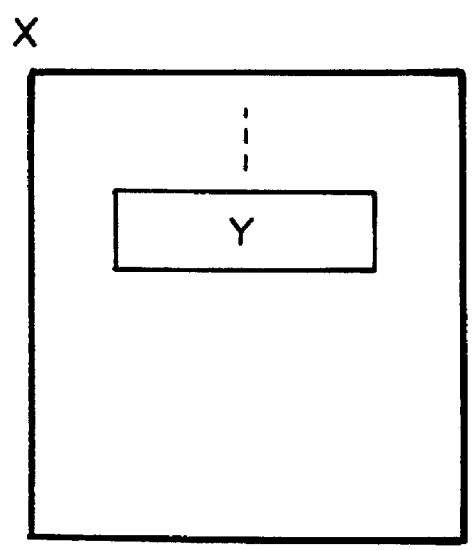
FIG. 12 shows a state of a catalog developed to a memory in accordance with the present invention.

Further, as shown in FIG. 1(a), when the catalog Y of the same procedure is invoked twice or more from the catalog X, in this invention, at most only one catalog Y is developed to the developing area of the memory at any arbitrary point of time, as shown in FIG. 12. Thus, the memory can efficiently be utilized.

As described above, according to the present invention, since the overlapping operations can be formed into a single catalog, it is possible to improve the catalog storage efficiency and maintenance efficiency. Further, since the catalog can be developed to the memory as a unit as necessary, the memory utilizing efficiency is improved.

In addition, as compared with the in-line developing system no insertion/developing process is necessary when the catalog is developed to the memory, and since consciousness of the nesting condition is not necessary, the program structure is simple and can readily be realized.

Still further, since, as compared with the in-line developing system, the resource effective range of a single catalog is clear, it is possible to control a general purpose catalog.

What is claimed is:

1. A catalog management system, comprising:

a function execution control portion for, upon execution of catalog requests from a user, issuing catalog start requests to a catalog control portion and, upon generation of a catalog executing environment by said catalog control portion, repeatedly and sequentially invoking a function executing portion according to catalog data;

said catalog control portion generating the catalog executing environment by invoking a catalog file input/output portion according to the catalog start request to develop the catalog data of a catalog data file to a catalog data area via a catalog data management portion;

said function executing portion, in response to said function execution control portion, repeatedly and sequentially executing functions specified by values set to an intermediate buffer by reference of said catalog data management portion to a data table of the catalog data area; and data tables having a data structure, the data tables being referenced by said function executing portion prior to referencing the catalog data area to obtain information necessary for achieving nesting of a number of catalogs, wherein the catalog data area is a memory area where the catalog data is developed, which is generated according to the number of catalogs to be nested, the catalog data area comprising a plurality of catalog pools, each catalog pool storing pool data of a corresponding catalog in a pool data area, the catalog data area further comprising a pool management table for determining uniquely each catalog pool by an associated pool number, and said data table stores data on the catalog data being currently executed, said data table comprising a pool data copied from the catalog pool of said catalog data area and a pool number.

2. The catalog management system according to claim 1, wherein determination of the pool number within said data table is achieved by incrementing the pool number at the time of start of execution of the corresponding catalog, and by decrementing the pool number at the end of execution of the corresponding catalog.

3. The catalog management system according to claim 1, wherein an entry is added to said pool management table at the time of start of execution of a corresponding catalog and an entry is deleted at the time of the end of execution of the corresponding catalog, and an initial value is set to the pool data within said catalog pool at the time of start of execution to copy a newest pool data to said data table.

4. The catalog management system according to claim 1, wherein, in order to achieve nesting, a pool number within said data table is referenced prior to access to the catalog data to determine a corresponding catalog table, the corresponding catalog table being a current target from the pool management table.

* * * * *